United States Patent
Strei et al.

(10) Patent No.: US 9,010,191 B2
(45) Date of Patent: Apr. 21, 2015

(54) PRESSURE SENSOR MODULE FOR SUB-SEA APPLICATIONS

(71) Applicant: Rosemount Inc., Chanhassen, MN (US)

(72) Inventors: David Strei, Waconia, MN (US); David Broden, Andover, MN (US); Ivar Breen, Stavanger (NO)

(73) Assignee: Rosemount Inc., Chanhassen, MN (US)

( * ) Notice: Subject to any disclaimer, the term of this patent is extended or adjusted under 35 U.S.C. 154(b) by 258 days.

(21) Appl. No.: 13/630,547

(22) Filed: Sep. 28, 2012

(65) Prior Publication Data

US 2013/0160560 A1  Jun. 27, 2013

Related U.S. Application Data

(60) Provisional application No. 61/579,234, filed on Dec. 22, 2011.

(51) Int. Cl.
  *G01L 15/00* (2006.01)
  *G01C 13/00* (2006.01)
  (Continued)

(52) U.S. Cl.
  CPC .............. *G01L 9/0042* (2013.01); *G01C 13/00* (2013.01); *G01L 13/026* (2013.01); *G01L 19/003* (2013.01); *G01L 19/0046* (2013.01)

(58) Field of Classification Search
  CPC ........................................... G01L 13/00–13/06
  USPC .................................................... 73/700–756
  See application file for complete search history.

(56) References Cited

U.S. PATENT DOCUMENTS

| | | | |
|---|---|---|---|
| 5,022,270 A | 6/1991 | Rud, Jr. | 73/706 |
| 5,524,492 A | 6/1996 | Frick et al. | 73/706 |

(Continued)

FOREIGN PATENT DOCUMENTS

| | | |
|---|---|---|
| CN | 1131462 | 9/1996 |
| CN | 1447096 | 10/2003 |

(Continued)

OTHER PUBLICATIONS

Hibner, E.L. and L.E. Shoemaker: "The Advantages of Nickel Alloys for Seawater Service, a New Generation of High Strength, Corrosion-Resistant Superalloy Products for Military Springs, Fasteners and Hardware". Special Metals Corporation, Huntington, WV 25705.

(Continued)

*Primary Examiner* — Andre Allen
(74) *Attorney, Agent, or Firm* — Westman, Champlin & Koehler, P.A.

(57) ABSTRACT

A co-planar differential pressure sensor module is provided. The module includes a base having a pair of recesses. A pair of pedestals is also provided where each pedestal is disposed in a respective recess and is coupled to a respective isolation diaphragm. A differential pressure sensor has a sensing diaphragm and a pair of pressure sensing ports. Each port of the differential pressure sensor is fluidically coupled to a respective isolation diaphragm by a fill fluid. The module also includes circuitry coupled to the differential pressure sensor to measure an electrical characteristic of the sensor that varies with differential pressure. The base is constructed from a material that is suitable for submersion in seawater. A method of constructing a co-planar differential pressure sensor module is also provided. In another embodiment, a pressure sensor module is provided. The pressure sensor module includes a base having a recess. A pedestal is disposed in the recess and is coupled to an isolation diaphragm. A pressure sensor having a sensing diaphragm and a pressure sensing port is fluidically coupled to the isolation diaphragm by a fill fluid. Circuitry is coupled to the pressure sensor to measure an electrical characteristic of the sensor that varies with pressure. The base is constructed from a material that is suitable for submersion in seawater.

25 Claims, 7 Drawing Sheets

(51) Int. Cl.
G01L 9/00 (2006.01)
G01L 13/02 (2006.01)
G01L 19/00 (2006.01)

(56) References Cited

U.S. PATENT DOCUMENTS

| | | | |
|---|---|---|---|
| 5,637,802 A | 6/1997 | Frick et al. | 73/724 |
| 5,665,899 A | 9/1997 | Willcox | 73/1.63 |
| 5,668,322 A | 9/1997 | Broden | 73/756 |
| 5,680,109 A | 10/1997 | Lowe et al. | 340/608 |
| 5,731,522 A | 3/1998 | Sittler | 73/708 |
| 6,079,276 A | 6/2000 | Frick et al. | 73/718 |
| 6,082,199 A | 7/2000 | Frick et al. | 73/724 |
| 6,089,097 A | 7/2000 | Frick et al. | 73/718 |
| 6,425,290 B2 | 7/2002 | Wilcox et al. | 73/715 |
| 6,457,367 B1 | 10/2002 | Behm et al. | 73/753 |
| 6,473,711 B1 | 10/2002 | Sittler et al. | 702/138 |
| 6,480,131 B1 | 11/2002 | Roper et al. | 341/155 |
| 6,484,585 B1 | 11/2002 | Sittler et al. | 73/718 |
| 6,505,516 B1 | 1/2003 | Frick et al. | 73/718 |
| 6,508,129 B1 | 1/2003 | Sittler | 73/756 |
| 6,516,671 B2 | 2/2003 | Romo et al. | 73/718 |
| 6,520,020 B1 | 2/2003 | Lutz et al. | 73/706 |
| 6,561,038 B2 | 5/2003 | Gravel et al. | 73/729.2 |
| 6,848,316 B2 | 2/2005 | Sittler et al. | 73/706 |
| 6,966,229 B2 | 11/2005 | Seegberg | 73/754 |
| 7,962,294 B2 | 6/2011 | Dozoretz et al. | 702/50 |
| 8,122,771 B2 | 2/2012 | Seegberg et al. | 73/756 |
| 2003/0177837 A1 | 9/2003 | Broden et al. | 73/716 |
| 2005/0193825 A1 | 9/2005 | Otsuka | |
| 2009/0000393 A1* | 1/2009 | Nyfors et al. | 73/861.19 |
| 2010/0198547 A1* | 8/2010 | Mulligan et al. | 702/100 |
| 2012/0079884 A1 | 4/2012 | Broden et al. | |

FOREIGN PATENT DOCUMENTS

| | | |
|---|---|---|
| CN | 203069314 | 7/2013 |
| WO | 95/08759 A1 | 3/1995 |
| WO | WO 2011/000423 | 1/2011 |

OTHER PUBLICATIONS

Fuji Electric—Differential Presure Transmitters for the Oil and Gas Industry. www.offshore-technology.com/contractors/instrumentation/fuji-electric/fuji-electric1.html.

International Search Report and Written Opinion of the International Searching Authority dated Jun. 5, 2013 for International Application No. PCT/US2012/070545, filed Dec. 19, 2012.

General Specifications EJX110A Differential Pressure Transmitter, Jan. 1, 2009. Retrieved from Internet : http://web.archive.org/web/20090407093933/http://www.yokogawa.com/fld/pdf/ejx/GS01C25B01-01E.pdf.

"Application of Hardgrove Alloy C-276 Material in Chemical Pressure Vessel", by Li, Petrochemical Design, col. 20, No. 1, pp. 36-38, Dec. 31, 2003.

Office Action from Australian Application No. 2012359068, dated Jul. 15, 2014.

Office Action from Chinese Application No. 2012105061303, dated Jun. 10, 2014.

Office Action from European Application No. 12809549.4, dated Jul. 29, 2014.

Office Action from Chinese Patent Application No. 201210506130.3, dated Jan. 14, 2015.

* cited by examiner

PRESSURE SENSOR MODULE FOR SUB-SEA APPLICATIONS

CROSS-REFERENCE TO RELATED APPLICATION

The present application is based on and claims the benefit of U.S. provisional patent application Ser. No. 61/579,234, filed Dec. 22, 2011, the content of which is hereby incorporated by reference in its entirety.

BACKGROUND

A process transmitter generally includes a transducer or sensor that responds to a process variable. A process variable generally refers to a physical or chemical state of matter or conversion of energy. Examples of process variables include pressure, temperature, flow, conductivity, pH and other properties. Pressure is considered to be a basic process variable that can be used to measure flow, level and even temperature.

Pressure transmitters are commonly used in industrial processes to measure and monitor pressures in various industrial process fluids, such as slurries, liquids, vapors and gases of chemical, pulp, petroleum, gas, pharmaceuticals, food and other fluid-type processing plants. Differential pressure transmitters generally include a pair of process fluid pressure inputs which are operably coupled to a differential pressure sensor (within the transmitter) that responds to the difference in pressure between the two inputs. Differential pressure transmitters typically include a pair of isolator diaphragms that are positioned in the process fluid inlets and isolate the differential pressure sensor from the harsh process fluids being sensed. Pressure is transferred from the process fluid to the differential pressure sensor through a substantially incompressible fill fluid carried in a passageway extending from each isolator diaphragm to the differential pressure sensor.

There are typically two types of differential pressure sensor modules. A first type of differential pressure sensor module is termed a bi-planar sensor module. In such a differential pressure sensor module, the pair of isolation diaphragms are disposed in different planes, and often coaxially aligned with one another. FIG. 1 is a diagrammatic view of a known bi-planar sensor module (illustrated within rectangle 12) being employed in a differential pressure transmitter 10 that is rated to 15,000 psi line pressure. Differential pressure transmitters using bi-planar sensor modules for line pressures greater than 6000 psi are often very large and complex. This is generally due to the flanges and bolts that are required to retain such high line pressure. Such large assemblies are typically not ideal for applications requiring submersion in sea water because they require large, expensive enclosures to protect the sensor module from both corrosion in sea water and the potentially large pressure resulting from deep sub-sea use. For example, such a differential pressure transmitter 10 may have a height over 8.5 inches and a width of over 6 inches.

A second type of differential pressure sensor module is known as a co-planar sensor module. In the co-planar sensor module, the isolator diaphragms are typically disposed in the same plane as one another.

Even when configured for high line pressures, transmitter 10 (shown in FIG. 1) is not suitable for direct immersion in sea water. Accordingly, if the transmitter is to be used in applications that require it to be submerged in sea water, such as on a well head of an oil well, significant modifications are required. FIG. 2 illustrates the bi-planar differential pressure sensor module 14 of FIG. 1 where sensor module 14 has been prepared for sub-sea use. The assembly 20 comprising sensor module 14 and enclosure 16 is quite large due to the need to construct an enclosure 16 around the entire sensor module 14. For example, one such assembly 20 has a height of approximately 16 inches and a diameter of approximately 8 inches. Moreover, since the materials used in construction of enclosure 16 are costly, enclosure 16 alone can make the entire assembly 20 quite expensive.

Providing a high line pressure differential pressure transmitter that is more easily adaptable to sub-sea environments without requiring extensive modification or expense will facilitate the more widespread use of differential pressure sensor modules and the measurement of associated variables, such as flow, pressure and level in sub-sea environments.

SUMMARY

In one embodiment, a co-planar differential pressure sensor module is provided. The module includes a base having a pair of recesses. A pair of pedestals is also provided where each pedestal is disposed in a respective recess and is coupled to a respective isolation diaphragm. A differential pressure sensor has a sensing diaphragm and a pair of pressure sensing ports. Each port of the differential pressure sensor is fluidically coupled to a respective isolation diaphragm by a fill fluid. The module also includes circuitry coupled to the differential pressure sensor to measure an electrical characteristic of the sensor that varies with differential pressure. The base is constructed from a material that is suitable for submersion in seawater. A method of constructing a co-planar differential pressure sensor module is also provided. In another embodiment, a pressure sensor module is provided. The pressure sensor module includes a base having a recess. A pedestal is disposed in the recess and is coupled to an isolation diaphragm. A pressure sensor having a sensing diaphragm and a pressure sensing port is fluidically coupled to the isolation diaphragm by a fill fluid. Circuitry is coupled to the pressure sensor to measure an electrical characteristic of the sensor that varies with pressure. The base is constructed from a material that is suitable for submersion in seawater.

DETAILED DESCRIPTION OF ILLUSTRATIVE EMBODIMENTS

Embodiments of the present invention generally may be used in a co-planar differential pressure sensor module that has a pair of co-planar isolation diaphragms and an all-welded construction. Additionally, at least some embodiments of the present invention ensure that all critical line-pressure retaining welds are protected from sea water to reduce the possibility of weld failure due to corrosion. Further, suitable materials are used to simplify the preparation of the co-planar differential pressure sensor module for sub-sea applications. Alternatively, embodiments of the present invention may be used in a pressure transmitter that does not sense differential pressure, but instead senses a single process fluid pressure, such as an absolute or gauge pressure transmitter.

Figure 3:
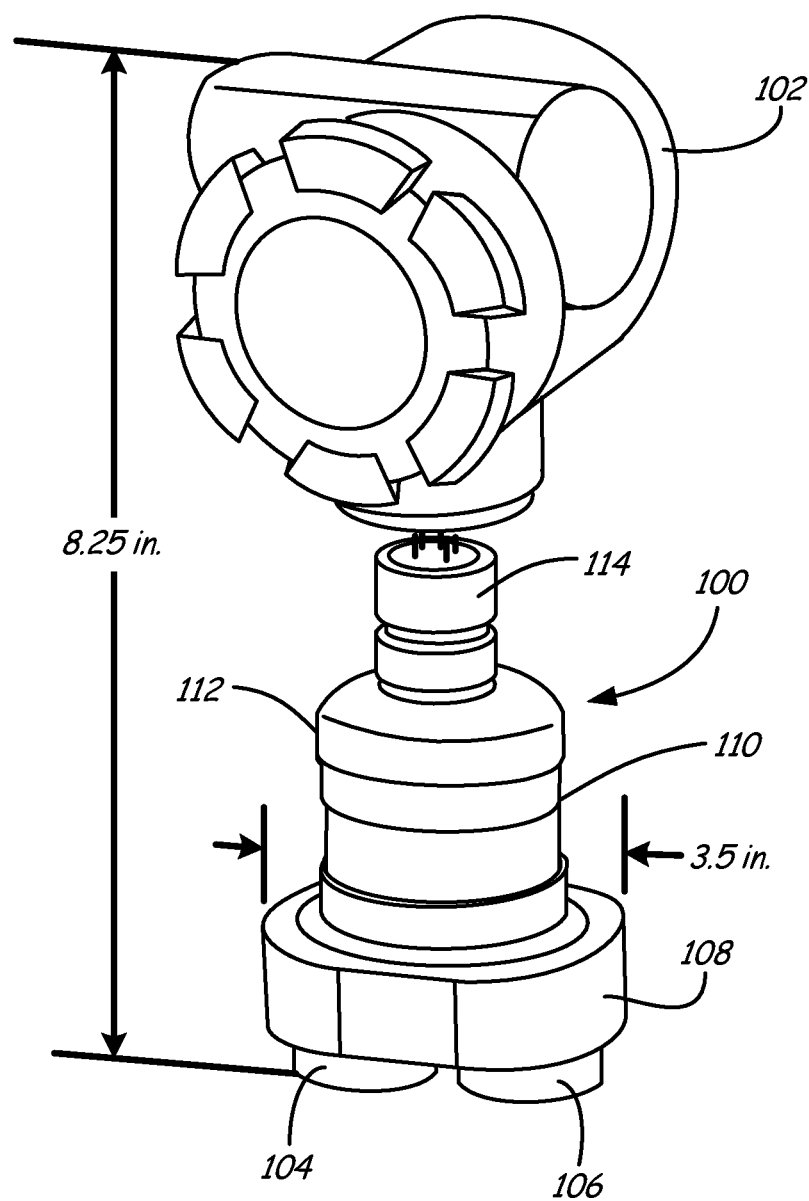
FIG. 3 is a diagrammatic view of a co-planar differential pressure sensor module in accordance with an embodiment of the present invention.

FIG. 3 is a diagrammatic view of a co-planar differential pressure sensor module 100 in accordance with an embodiment of the present invention. Sensor module 100 resembles prior-art sensor modules in that it is coupleable to electronics enclosure 102 and can measure differential pressure introduced at a pair of process fluid pressure inlets 104, 106. However, a base portion 108 of differential pressure sensor module 100 is constructed from a material that is suitable for direct immersion in salt water. As defined herein, "Suitable for direct immersion in salt water" means that the material will not corrode or otherwise be impermissibly degraded in the presence of salt water for a viable product lifetime. Examples of materials that are suitable for direct immersion in salt water include Alloy C276 available from Haynes International Inc., of Kokomo, Ind. under the trade designation Hastelloy C276; Inconel alloy 686, available from The Special Metal Family of Companies of New Hartford, N.Y.; and Alloy C-22 available from Haynes International. Of particular interest is Alloy C276, which has the following chemical composition (by % weight): Molybdenum 15.0-17.0; Chromium 14.5-16.5; Iron 4.0-7.0; Tungsten 3.0-4.5; Cobalt 2.5 maximum; Manganese 1.0 maximum; Vanadium 0.35 maximum; Carbon 0.01 maximum; Phosphorus 0.04 maximum; Sulfur 0.03 maximum; Silicon 0.08 maximum; and balance Nickel.

Figure 1:
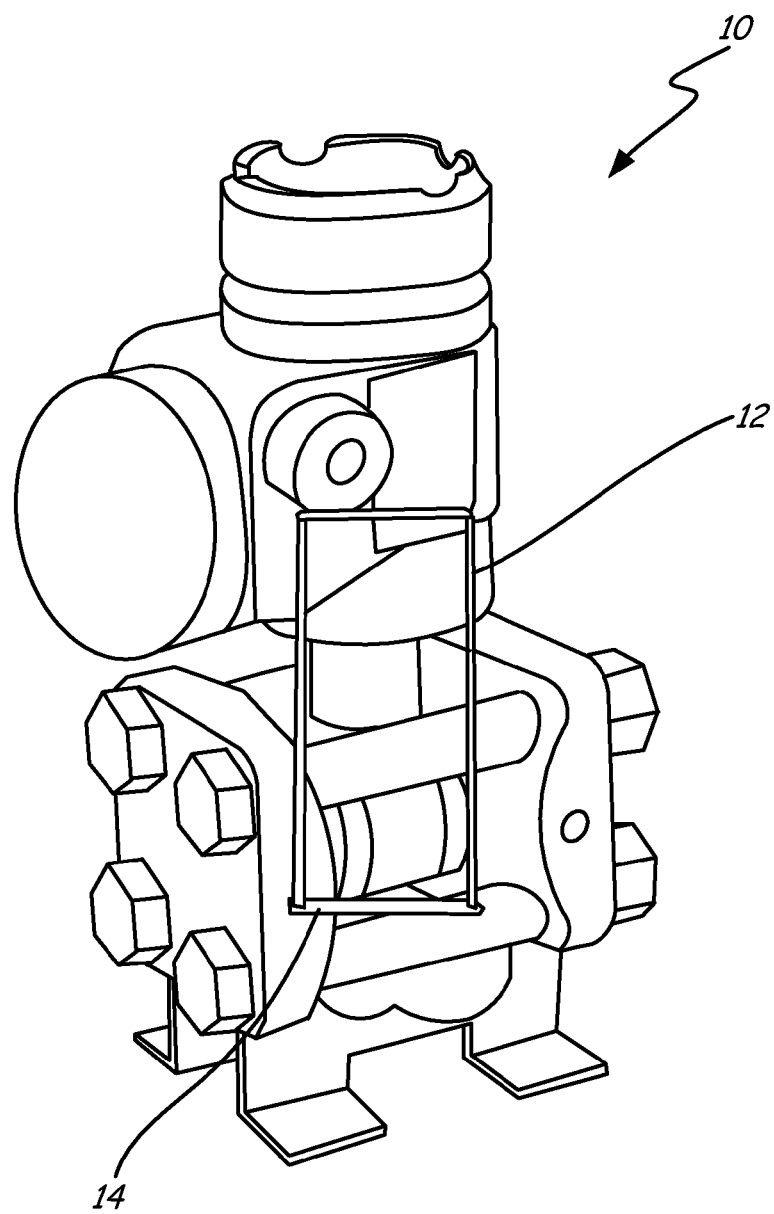
FIG. 1 is a diagrammatic view of a known bi-planar sensor module.
Figure 2:
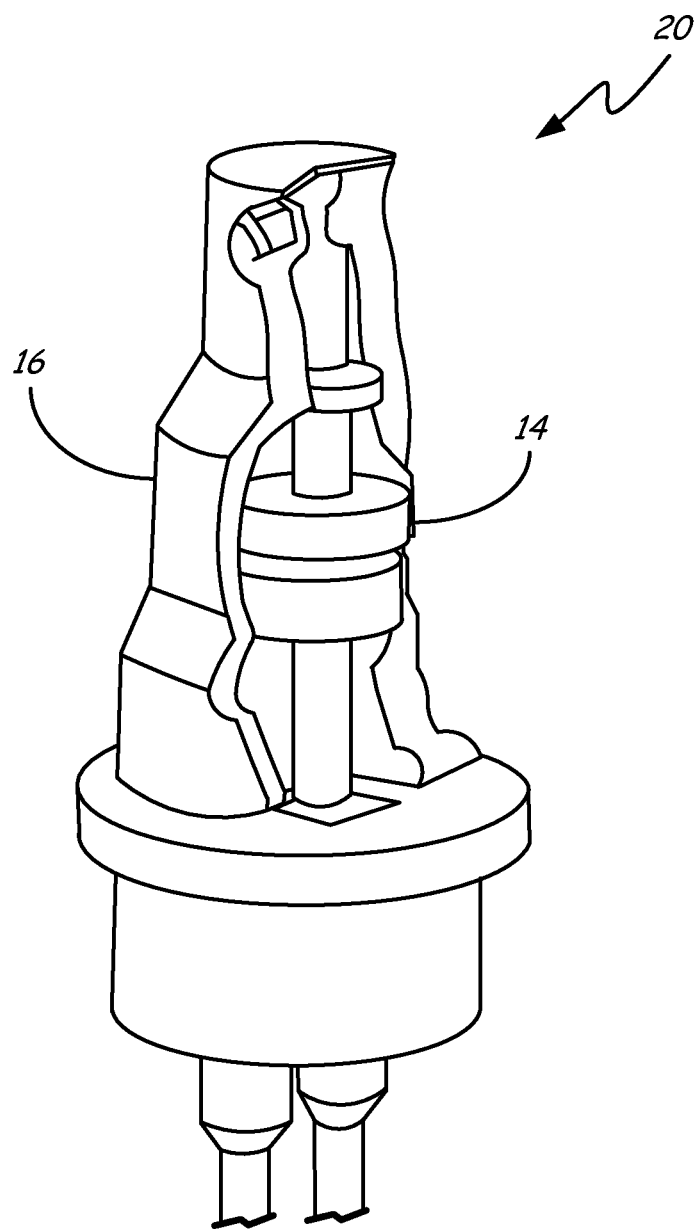
FIG. 2 illustrates the bi-planar differential pressure sensor module of FIG. 1 prepared for sub-sea use.

As illustrated in FIG. 3, base portion 108 may be designed much smaller than the differential pressure sensor module illustrated in FIGS. 1 and 2. Specifically in this example, base portion 108 has a diameter of 3.5 inches. Even when coupled to electronics enclosure 102, the overall height of the assembled transmitter in this example is only 8.25 inches. Sensor module 100 also includes sidewall 110 coupled to base portion 108, which sidewall 110 couples to cap 112. An electrical feedthrough connector 114 is coupleable to electronics enclosure 102 and includes conductors to provide power to module 110 as well as bidirectional communication. In some embodiments, module 100 may communicate over the same conductors through which it is powered.

Figure 4:
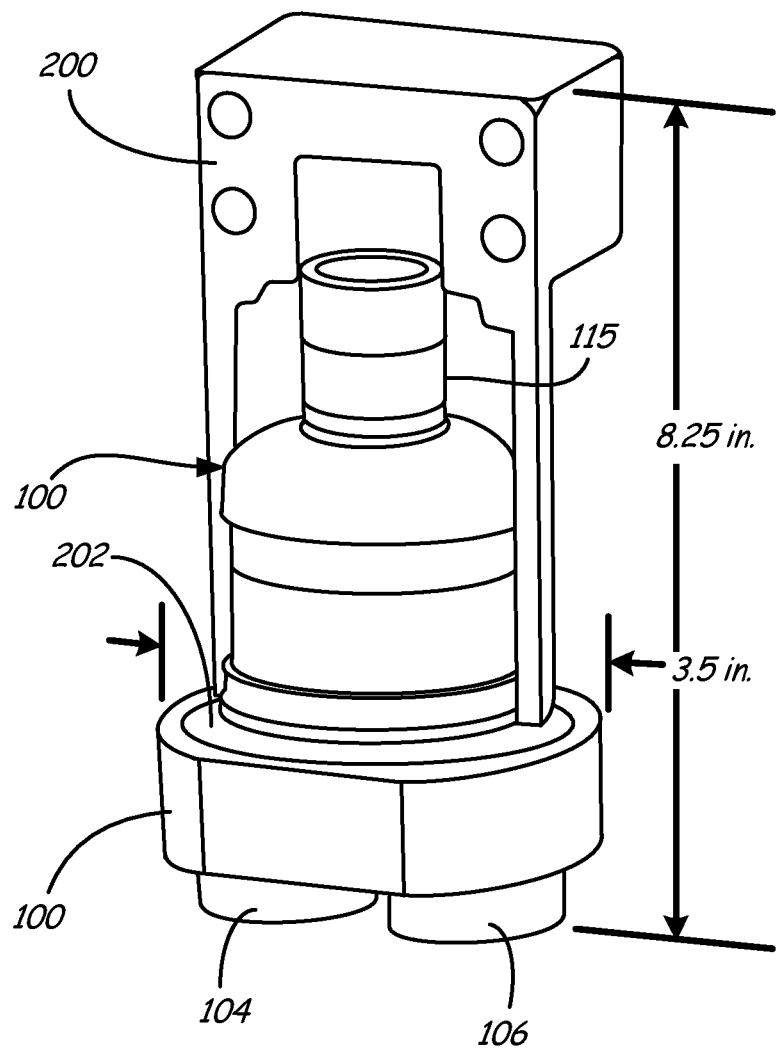
FIG. 4 is a diagrammatic view of the co-planar differential pressure sensor module illustrated in FIG. 3 adapted for direct immersion in sea water.

FIG. 4 is a diagrammatic view of co-planar differential pressure sensor module 100 (illustrated in FIG. 3) adapted for direct immersion in sea water. Specifically, the upper portion of co-planar differential pressure module 100, proximate electrical connection point 115, is covered with a high-pressure bearing end cap 200 that is constructed from a material that is suitable for direct immersion in sea water. Moreover, the high pressures associated with exposure to sea water at extreme depths are borne by end cap 200 which maintains its shape and integrity while so subjected. Additionally, end cap 200 is preferably constructed from the same material as the bottom portion 108 of co-planar differential pressure sensor module 100. For example, if bottom portion 108 of module 100 is constructed from Alloy C276, it is preferred that end cap 200 also be constructed from Alloy C276. However, in embodiments where they are not constructed from the same materials, end cap 200 must be constructed from a material that is suitable for welding to portion 108 of module 100. This means that either the metallurgy of the two materials must be compatible enough for welding and/or the melting points of the two materials must be close enough to each other. An additional requirement for welding different metals is the metallurgy of the resulting weld (which is different than either starting material) must also be corrosion resistant. As can be appreciated from FIG. 4, co-planar differential pressure sensor module 100 can be adapted for direct immersion in sea water relatively easily by simply welding end cap 200 directly to lower portion 108 at interface 202. Moreover, the entire assembly, in this example, is still relatively small, having a diameter of about 3.5 inches and a height of only 6.7 inches. Electrical connection point 115 through end cap 200 can be performed in any suitable manner. For example, a high-pressure glass header may be used to pass conductors through end cap 200 in order to couple to connection point 115.

Figure 5:
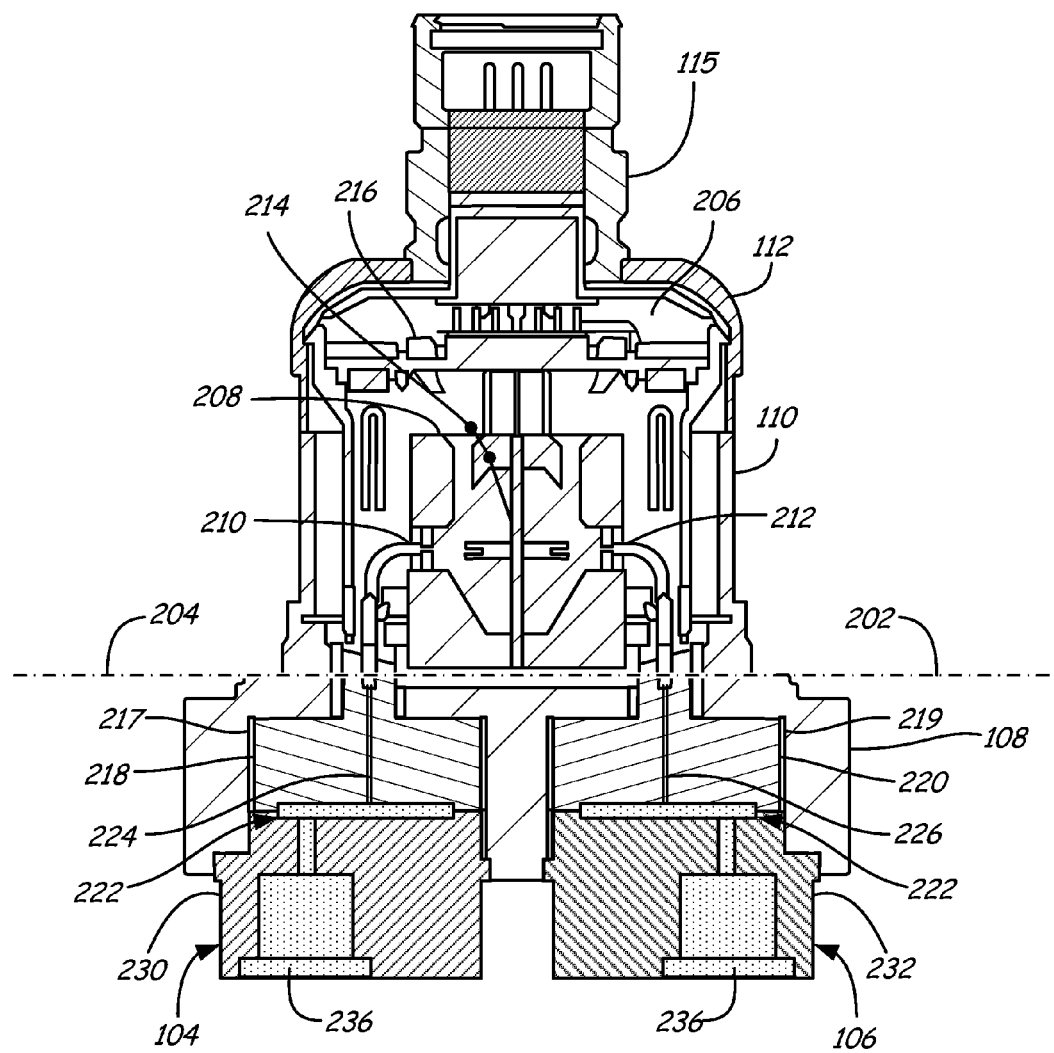
FIG. 5 is a diagrammatic cross sectional view of a co-planar differential pressure sensor module in accordance with embodiment of the present invention.

FIG. 5 is a diagrammatic cross sectional view of co-planar differential pressure sensor module 100 in accordance with embodiment of the present invention. Module 100 includes a lower portion 108 that is constructed from a material suitable for direct immersion in sea water. In fact, all components below line 204 are adapted for exposure to sea water. While a number of viable materials may be suitable for submersion in sea water, one particularly suitable example is Alloy C276, set forth above. Lower portion 108 is coupled to sidewall 110 and cap 112 to define a chamber 206 therein. Differential pressure sensor 208 is disposed in chamber 206 and has a pair of differential pressure sensor inputs 210, 212 that convey process pressure to deflectable diaphragm 214, which has an electrical characteristic, such as capacitance, that varies with diaphragm deflection. The electrical characteristic is measured, or otherwise transduced by circuitry 216 disposed proximate sensor 208. Circuitry 216 also conditions the capacitance measurement for transmission through electrical connection point 115.

As set forth above, all components positioned below line 204 may be exposed directly to sea water. Thus, the components must not only be capable resisting corrosion in such environments, they must be able to bear high line pressure, such as 15000 psi. Base portion 108 includes a pair of recesses 217, 219 each having a respective pedestal 218, 220. An isolator diaphragm 222 is coupled to each pedestal 218, 220 and conveys a respective process fluid pressure through a fill fluid located in respective passageways 224, 226. In this way, the two process fluid pressures are conveyed to differential pressure sensor 208 without allowing the process fluid to contact differential pressure sensor 208.

Another important aspect of module 100 is the separation between components loaded from high line pressure (up to 15,000 psi) from the components loaded by high ambient pressures ("only" 5,000 psi) in the subsea environment. This separation, indicated at reference numeral 235, is important for several reasons. The depth in the sea has no impact on the differential pressure reading. The high line pressure is not static, resulting in pressure fatigue loading on sensor 208, process connectors 230, 232, and pedestals 218, 220. Because the housing components are isolated from the line pressure, the housing components do not need to be designed for fatigue but only for a constant ambient pressure.

As illustrated in FIG. 5, each process fluid pressure port 104, 106 preferably includes a respective integrated process connector 230, 232 that is welded to lower portion 108 in order to provide a corrosion-resistant, high-pressure coupling. Each weld extends about the entire circumference of each connector such that the weld not only robustly mounts the connector to portion 108, but also seals the connector thereto. The weld defines the only interaction between components loaded by ambient pressure and components loaded by line pressure. Each integrated process connector 230, 232 includes a process fluid pressure receiving aperture 236 that is suitable for exposure to process fluid at pressures up to 15,000 psi. Additionally, each pedestal 218, 220 is also preferably welded to its respective process connector 230, 232 before the process connectors 230, 232 are welded to portion 108. In this way, the critical process pressure retaining welds are protected inside the module from the corrosive effects of sea water exposure. In some embodiments, process connectors 230, 232 can be prepared for both welded and autoclave connections.

Figure 6:
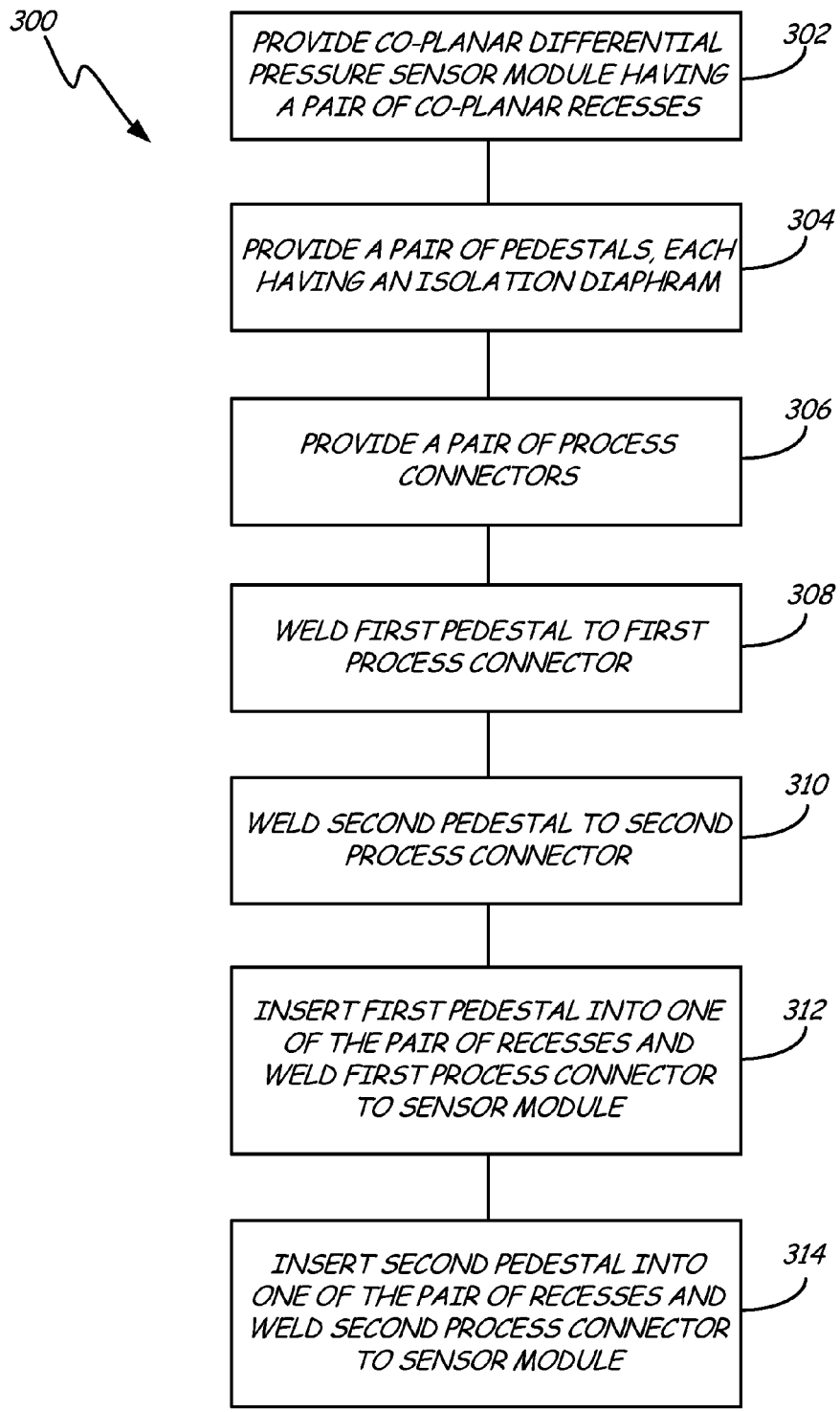
FIG. 6 is a flow diagram of a method of constructing a co-planar differential pressure sensor in accordance with an embodiment of the present invention.

FIG. 6 is a flow diagram of a method of constructing a co-planar differential pressure sensor in accordance with an embodiment of the present invention. Method 300 begins at block 302 where a co-planar differential pressure sensor module having a pair of co-planar recesses is provided. Next, at block 304, a pair of pedestals is provided. Each pedestal has an isolation diaphragm welded thereto. At block 306, a pair of process connectors is provided. At block 308, a first pedestal is welded to a first process connector. As set forth above, such weld is continuous about the circumference of the first process connector in order to completely seal the first process connector to the first pedestal. At block 310, a second pedestal is welded to a second process connector. Again, such weld is continuous about the circumference of the second process connector in order to completely seal the second process connector to the second pedestal. At block 312, the first pedestal is inserted into one of the pair of recesses and the first process connector is welded to the co-planar differential pressure sensor module. The weld is preferably a continuous weld about the circumference of the first process connector in order to seal the first process connector to the co-planar differential pressure sensor module. At block 314, the second pedestal is inserted into the other of the pair of recesses and the second process connector is welded to the co-planar differential pressure sensor module. The weld is preferably a continuous weld about the circumference of the second process connector in order to seal the second process connector to the co-planar differential pressure sensor module. As set forth above, in some embodiments, a portion of the differential pressure sensor module and the first and second process connectors are constructed from a material that is suitable for direct submersion in seawater, such as Alloy C276.

Figure 7:
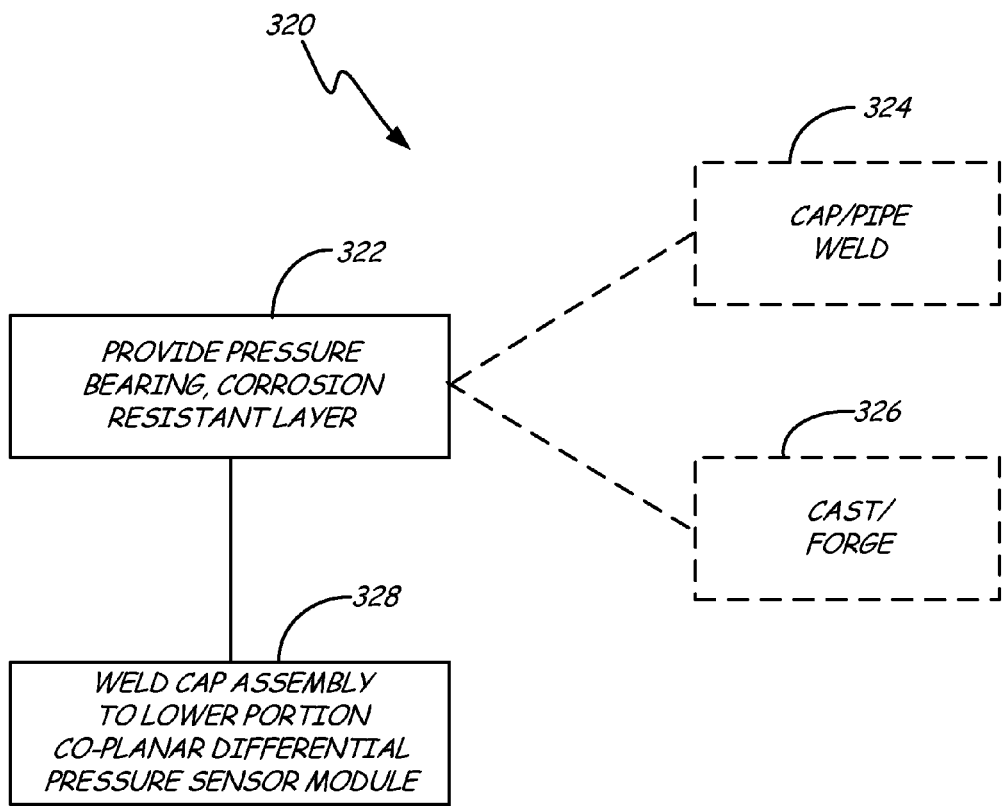
FIG. 7 is a flow diagram of a method for adapting a co-planar differential pressure sensor module for submersion in seawater in accordance with an embodiment of the present invention.

FIG. 7 is a flow diagram of a method for adapting a co-planar differential pressure sensor module for submersion in seawater in accordance with an embodiment of the present invention. Method 320 begins at block 322 where a pressure-bearing, corrosion-resistant cover assembly is provided. This cover may be the cover illustrated at reference numeral 200 in FIG. 4, or any other suitable cover. The cover is preferably formed from Alloy C276 and may be constructed by welding a cylindrical section to a cap section, as indicated at phantom block 324. Alternatively, the entire cover assembly can be manufactured as a single piece, such as by casting or forging, as illustrated at block 326. At block 328, the corrosion-resistance cover assembly is welded to a base portion of a co-planar differential pressure sensor. The weld is preferably continuous such that the cover assembly is sealed to the co-planar differential pressure sensor module. When so configured, embodiments of the present invention can provide a differential pressure sensor module rated for line pressures as high as 15,000 psi while submerged in seawater for a period of years. Further, it is believed that embodiments of the present invention can provide differential pressure measurements in such applications for substantially less cost than prior designs.

Embodiments of the present invention generally provide a co-planar differential pressure sensor module having at least a portion that is made from a material that is selected for its resistance to corrosion in seawater. One exemplary material is Alloy C276. Additionally, embodiments of the present invention generally leverage an all-welded approach to eliminate the need for large bolted flanges, thereby reducing size and potentially eliminating crevices where corrosion can easily begin. Further still, some embodiments of the present invention position critical, process pressure-retaining welds within the module in order to protect the welds from seawater corrosion. Additionally, in some embodiments, a pressure sensor module includes a base with a single recess and a pedestal in the recess that is coupled to an isolation diaphragm. A pressure sensor, such as an absolute pressure sensor or gauge pressure sensor includes a sensing diaphragm and a pressure sensing port fluidically coupled to the isolation diaphragm by a fill fluid. Circuitry of the pressure sensor module is coupled to the pressure sensor to measure an electrical characteristic of the sensor that varies with pressure. The base of the pressure sensor module is constructed from a material that is suitable for submersion in seawater.

Although the present invention has been described with reference to preferred embodiments, workers skilled in the art will recognize that changes may be made in form and detail without departing from the spirit and scope of the invention. For example, while embodiments of the present invention are generally directed to a co-planar differential pressure sensor module that can be adapted for sub-sea use, embodiments of the present invention may also be practicable in other highly corrosive environments.

What is claimed is:

1. A co-planar differential pressure sensor module comprising:
   a base having a pair of recesses,
   a pair of pedestals, each pedestal being disposed in a respective recess and being coupled to a respective isolation diaphragm;
   a differential pressure sensor having a sensing diaphragm and a pair of pressure sensing ports, each port being fluidically coupled to a respective isolation diaphragm by a fill fluid;
   circuitry coupled to the differential pressure sensor to measure an electrical characteristic of the sensor that varies with differential pressure; and
   wherein the base is constructed from a material that is suitable for submersion in seawater.

2. The co-planar differential pressure sensor module of claim 1, wherein the material is Alloy C276.

3. The co-planar differential pressure sensor module of claim 1, and further comprising a pair of process connectors, each process connector being coupled to a respective pedestal and being coupled to the base.

4. The co-planar differential pressure sensor module of claim 3, wherein the pair of process connectors are constructed from a material that is suitable for submersion in seawater.

5. The co-planar differential pressure sensor module of claim 4, wherein the material is Alloy C276.

6. The co-planar differential pressure sensor module of claim 3, wherein each process connector is welded to a respective pedestal and welded to the base.

7. The co-planar differential pressure sensor module of claim 6, wherein the only structural connection between the line pressure components of the module and ambient pressure-loaded components of the module is at welds between each process connector and the base.

8. The co-planar differential pressure sensor module of claim 3, wherein the pair of process connectors are configured for both welded and autoclave connections.

9. The co-planar differential pressure sensor module of claim 1, and further comprising a cover disposed over a portion of the module and being coupled to the base.

10. The co-planar differential pressure sensor module of claim 9, wherein the cover is constructed from a material that is suitable for submersion in seawater.

11. The co-planar differential pressure sensor module of claim 10, wherein the cover is welded to the base in a continuous weld to seal the cover to the base.

12. A method of manufacturing a co-planar differential pressure sensor module, the method comprising:
   providing a co-planar differential pressure sensor module with a pair of co-planar recesses;
   providing a pair of pedestals, each pedestal having an isolator diaphragm;
   providing a pair of process connectors;
   welding a first pedestal to a first process connector;
   welding a second pedestal to a second process connector;
   inserting the first pedestal into one of the pair of co-planar recesses and welding the first process connector to the co-planar differential pressure sensor module; and
   inserting the second pedestal into the other of the pair of co-planar recesses and welding the second process connector to the co-planar differential pressure sensor module.

13. The method of claim 12, wherein providing the co-planar differential pressure sensor module includes providing a co-planar differential pressure sensor module having a portion that is adapted for submersion in seawater.

14. The method of claim 13, wherein the portion is proximate the pair of co-planar recesses.

15. The method of claim 13, wherein portion that is adapted for submersion in seawater is constructed from Alloy C276.

16. The method of claim 12, wherein providing the pair of process connectors includes providing the pair of process connectors that are adapted for submersion in seawater.

17. The method of claim 16, wherein the pair of process connectors are constructed from Alloy C276.

18. The method of claim 12, and further comprising affixing a cover to the co-planar differential pressure sensor module, the cover being adapted for submersion in seawater.

19. The method of claim 18, wherein the cover is constructed from Alloy C276.

20. A pressure sensor module comprising:
   a base having a recess;
   a pedestal disposed in the recess and being coupled to an isolation diaphragm;
   a pressure sensor having a sensing diaphragm and a pressure sensing port fluidically coupled to the isolation diaphragm by a fill fluid;
   circuitry coupled to the pressure sensor to measure an electrical characteristic of the sensor that varies with pressure; and
   wherein the base is constructed from a material that is suitable for submersion in seawater.

21. The pressure sensor module of claim 20, and further comprising a process connector coupled to the pedestal and being coupled to the base.

22. The pressure sensor module of claim 21, wherein the process connector is constructed from a material that is suitable for submersion in seawater.

23. The pressure sensor module of claim 22, wherein the material is Alloy C276.

24. The pressure sensor module of claim 21, wherein the process connector is welded to the pedestal and welded to the base.

25. The differential pressure sensor module of claim 24, wherein the only structural connection between the line pressure components of the module and ambient pressure-loaded components of the module is a weld between the process connector and the base.

* * * * *